United States Patent
Seeley et al.

(10) Patent No.: US 8,737,571 B1
(45) Date of Patent: May 27, 2014

(54) METHODS AND APPARATUS PROVIDING CALL QUALITY TESTING

(75) Inventors: Albert R. Seeley, Burlington, MA (US); Nathan David, Londonderry, NH (US); Zhongyi Chen, Burlington, MA (US); Douglas C. Williams, Acton, MA (US); Andrew Ullmann, Cambridge, MA (US)

(73) Assignee: Empirix Inc., Billerica, MA (US)

( * ) Notice: Subject to any disclaimer, the term of this patent is extended or adjusted under 35 U.S.C. 154(b) by 3436 days.

(21) Appl. No.: 10/880,300

(22) Filed: Jun. 29, 2004

(51) Int. Cl.
*H04M 1/24* (2006.01)
*H04M 3/08* (2006.01)
*H04M 3/22* (2006.01)

(52) U.S. Cl.
USPC .............................. 379/1.03; 379/24; 704/236

(58) Field of Classification Search
USPC ............... 379/1.01, 3, 9.02, 14, 10.03, 15.01, 379/15.02, 22.02, 22.08, 23, 24, 27.08, 379/29.09, 29.1, 31, 32.01; 704/200, 220, 704/221, 228, 234, 236–237, 243, 247; 370/241, 252
See application file for complete search history.

(56) References Cited

U.S. PATENT DOCUMENTS

| 5,987,320 | A * | 11/1999 | Bobick | 455/423 |
| 6,823,302 | B1 * | 11/2004 | Atkinson et al. | 704/216 |
| 2002/0110153 | A1 * | 8/2002 | Tomberlin | 370/503 |
| 2005/0015253 | A1 * | 1/2005 | Rambo et al. | 704/246 |

* cited by examiner

*Primary Examiner* — Quoc D Tran
(74) *Attorney, Agent, or Firm* — Baker & Hostetler LLP (57) ABSTRACT

A method, apparatus and computer readable medium for call quality testing is presented. A query is transmitted over a communications network from a first location to a second location. The query results in an audio signal at the second location, which is received at the first location. The audio signal is analyzed by comparing the signal with a reference signal clip. A statistical parameter is generated, the statistical parameter indicative of a quality of the received signal.

21 Claims, 4 Drawing Sheets

METHODS AND APPARATUS PROVIDING CALL QUALITY TESTING

BACKGROUND

The Public Switched Telephone Network (PSTN) is a collection of interconnected voice-oriented public telephone networks. The PSTN is sometimes referred to as the Plain Old Telephone Service (POTS). Originally, the PSTN was a network of fixed-line analog telephone systems, however the PSTN is now almost entirely digital and includes mobile as well as fixed (also referred to as land-line) telephones. The basic digital circuit in the PSTN is a 64-kilobit-per-second channel known as Digital Signal 0 (DS0). To carry a typical phone call the audio sound is digitized at an 8 kHz sample rate using 8-bit Pulse Code Modulation (PCM).

Multiple DS0s are multiplexed together on higher capacity circuits, such that 24 DS0s make a single DS1 signal, which when carried on copper is known as T1. The European equivalent is known as an E1 and contains 32 of the 64 kbit/s channels. In conventional networks, this multiplexing is moved as close to the end user as possible.

Another network used to carry voice data is known as Voice Over Internet Protocol (VOIP). VOIP allows users to send and receive voice and data information over a combination of a phone network and a digital communications network. A conventional VOIP network includes two gateways with a packet network between the gateways. A gateway is used to convert voice streams carried by conventional equipment into data packets and also to convert data packets into voice. A gateway is equipped with standard interfaces to the PSTN or Private Branch eXchange (PBX) as well as interfaces to a packet network. The necessary encoding/decoding, compression/decompression, voice activity detection/comfort noise generation and packetizing/depacketizing are performed by the gateway. The processing of a voice signal into the format necessary for transport over a packet network is performed by the encoding/decoding subsystem within the gateway also known as a vocoder or alternatively as a codec. In a conventional scenario wherein a first gateway is connected between a PSTN and a packet network and a second gateway is coupled between the packet network and a PBX, the output of the first gateway comprises packetized data, suitable for transmission across the packet network. The second gateway receives the packet data on the packet network. The vocoder within the second gateway depacketizes, decompresses and decodes the packet data into a voice signal.

Yet another network type used to carry voice data is a cellular telephony network. In a cellular telephony network a portable telephone, referred to as a cell phone, sends and receives messages through a cell site or cell tower. Radio waves are used to transfer signals to and from the cell phone. Each cell site (or more simply "cell") typically has a range of approximately 3-15 miles and overlaps other cells. All of the cells are connected to one or more cellular switching exchanges which can detect the strength of the signal received from the cell phone.

As the telephone user moves to or from one cell area to another, the exchange automatically commands the cell phone and a cell site with a stronger signal (from the cell phone) to go to a new radio channel. When the cell phone responds through the new cell site, the exchange switches the connection to the new cell site.

Another technology used with cellular phones is known as Code-Division Multiple Access (CDMA). CDMA cell phones are not assigned a specific channel but instead cycle through many channels in a pattern specific to each phone. As the user moves from one cell to another, the cell phone actually connects to both sites simultaneously. This is known as a "soft handoff" because, unlike with traditional cellular technology, there is no one defined point where the cell phone switches to the new cell.

Modern mobile phones use cells because radio frequencies are a limited, shared resource. Cell sites and cell phones change frequency under computer control and use low power transmitters so that a limited number of radio frequencies can be reused by many callers with less interference. CDMA handsets, in particular, have strict power controls to avoid interference with each other.

The quality of a voice signal transmitted over a communications network can be evaluated in several ways. One way of evaluating vice quality of a communication comprises using one or more scoring metrics. These metrics may include Perceptual Speech Quality Measurement (PSQM), Perceptual Analysis Measurement System (PAMS), Perceptual Evaluation of Speech Quality (PESQ) and Mean Opinion Score (MOS).

Each of PSQM, PAMS, and PESQ metrics measure perceptual speech quality for narrowband (300-3400 Hz) telephone signals. These metrics require active testing, in which a reference voice signal is transmitted across a network, and the received voice signal is compared with the reference signal. Each metric utilizes a mathematical process that measures the differences between the received signal and the reference signal based on factors of human perception, which results in a speech quality score.

The PSQM metric produces scores that reliably predict the results of subjective tests, and reflect a perceptual distance measure. PSQM scores reflect the amount of divergence from a clean signal that a distorted signal exhibits once it has been processed by some telephony system. PSQM scores range from 0 to infinity, the score representing the perceptual distance between the received signal and the reference signal. For example, a score of "0" indicates a perfect match between the received signal and the reference signal, or perfect quality. Higher PSQM scores indicate increasing levels of distortion, or lower quality. In practice, upper limits of PSQM scores range from 6 to 12. One drawback associated with the PSQM metric is that it does not accurately report the effect of distortion when that distortion is caused by packet loss or other types of time clipping.

The PAMS metric comprises a speech quality metric that uses an auditory model to mathematically describe the way a human ear perceives voice, and performs an analysis of errors upon that model. PAMS scores range from 1 to 5, where 5 is the best quality possible. A PAMS score of 4 or above is widely considered "business quality voice." PAMS scores are usually expressed to two decimal places (4.84, for example). PAMS also splits its criteria into two different areas known as listening effort and listening quality. Listening Effort (LE) is defined as the amount of effort a person must give to understand the received signal. Listening Quality (LQ) is the overall clarity and fidelity of the received signal. PAMS is used to objectively predict results of subjective speech quality tests for networks on which coding distortions as well as packet loss are potential problems. PAMS has gained wide acceptance worldwide as an effective and robust measurement of speech quality in packet voice networks.

The PESQ metric is a combination of PAMS and PSQM. PESQ builds on both of the PAMS and PSQM techniques by adding additional processing steps to account for signal-level differences and the identification of errors associated with packet loss. PESQ provides a score of −1 to 4.5, which is equivalent to the PAMS Listening Quality Score of 1 to 5.

PESQ is an effective technique for measuring speech quality on networks with variable delay, filtering, packet or cell loss, and channel errors.

Another metric used for measuring voice quality is Mean Opinion Score (MOS). An example of how MOS is performed is where pre-selected voice samples are played to a mixed group of men and women under controlled conditions. The men and women are asked their opinion of the audio data they have just heard. The scores given by the group are weighed to give a single MOS score ranging from 1 (bad) to 5 (Excellent). Performing this type of subjective testing provides the most comprehensive means for determining and rating the overall perceived voice quality by users.

SUMMARY

Conventional mechanisms such as those explained above for providing voice communications in a network suffer from a variety of problems or deficiencies. One such problem is that conventional PSTN networks may include dirty lines or noisy switches which effect the quality of the signal transmitted across the line or through the switch.

Another problem associated with conventional VOIP networks is that execution of the compression and packetizing processes by a gateway requires time. The processes introduce delay, also known as latency, within the packet network. The network itself can also introduce delay, dependent upon how busy a router within the network path between the gateways is. The human ear can tolerate delay of approximately 250 milliseconds before perceiving a drop in continuity of a voice call. Delays longer than 250 milliseconds should be avoided in order to maintain a good quality VOIP transmission.

Yet another problem associated with conventional VOIP networks is that packet switched networks are typically bursty in nature, with lots of merging, exiting, and crossing traffic. Variable packet rates handled by the packet switches or routers lead to variable delay among packets going from one source location to a particular destination. This variable delay among packets is known as jitter. This jitter must be dealt with effectively in order to maintain the integrity of a VOIP transmission. In addition, routes from a source to a destination may change over time, causing more variable delay and possibly reordering of packets. Most gateways have buffers to collect packets and return acceptable continuity to the data to overcome some amount of jitter and reordering, however the use of the buffers to overcome jitter should be tuned to provide a minimal amount of delay.

Still another problem associated with conventional VOIP networks is that the packet network itself may also be a contributor to problems with transporting VOIP packets. The network may include various physical media and network protocols, as well as various routers and switches controlling the flow of traffic. Both the VOIP traffic and other non-VOIP traffic are competing for bandwidth on the same data network.

The protocols that define a data network were originally designed for non-real time traffic. In traditional digital packet networks, when a router or switch becomes overloaded with packets, the router or switch may drop packets in order to relieve the congestion. The end protocols have methods built into them to account for the dropped packets by routers and switches within the network such that data integrity is maintained, such as by requesting retransmission. While a certain amount of dropped packets are acceptable in a VOIP transmission, typically more than one to three percent of packet loss results in a poor quality VOIP transmission.

The packet data traveling between the gateways across a packet network may experience delay, jitter and packet loss. In order to provide a concise and accurate representation of the data, the gateways attempt to take into account and compensate for any delay, jitter and/or packet loss experienced by the data as it traverses the packet network between the gateways.

Voice is a periodic or variable signal that includes inter-syllabic components. A conventional telephone call includes voice elements as well as non-voice elements such as conversational pauses. Due to the real time nature of voice transmissions, an effective voice conversation requires a reasonable level of continuity. The continuity of a voice call can be affected negatively by a large number of packets competing with voice packets for network bandwidth. Traditional phone calls do not experience this problem, since they use a dedicated channel. The equipment necessary for processing a voice communications for transport over a packet network must be able to retain and maintain the nuance, inflection and pauses that comprise effective voice communication.

Another such problem is that a communications network which includes a conventional VOIP network may suffer from one or more of jitter, re-ordered packets, delay, dropped packets, and multiple packets, each of which may directly affect the quality of the signal traversing the VOIP network.

Still another problem is that conventional cellular networks can include static, distortion, interference, dropped calls, and the like which affect the voice signal. Speech and connection latency times, frequency distortions, phase distortions, amplitude distortions, electro-magnetic interference, signal distortions and radio frequency (RF) distortion can all affect the quality of voice signals transmitted across a PSTN, VOIP, a cellular network and various combinations thereof.

Embodiments of the present invention significantly overcome such deficiencies and provide mechanisms and techniques that perform call quality testing on a communications system to determine if the communication network is capable of providing an acceptable voice transport medium. In one embodiment a system for determining the call quality of a communications network includes a call generator, a voice analyzer and a collection of reference signal clips. The call generator is used to generate a call across a PSTN which may include one or more of a cellular network or a VOIP network to a customer premises device. The customer premises device responds with an audio signal. The audio signal traverses the network back to the test system where the signal is received. The received signal is compared to a reference signal clip and analyzed such that a scoring metric is provided. The analysis provides an indication of the quality of the voice signal received the customer premises device. Additionally post-processing may be performed on the received audio signal.

In another embodiment a method of determining call quality of a communication system includes transmitting a query over a communications network from a first location (e.g. a test system) to a second location (e.g. a customer premises device including an Interactive Voice Response (IVR) system). The IVR is a system that provides automated voice responses to actions performed by a telephone caller who calls the customer premises device. The query results in an audio signal being produced at the second location. The audio signal is transmitted to the first location. The audio signal is received at the first location across the communications network, where the signal is analyzed, such as by comparing the audio signal with a reference signal clip and generating a statistical parameter in response to the analysis, the statistical parameter indicative of a quality of the received audio signal.

The communications network may include a PSTN network, and may further include one or more of a VOIP network and a cellular network. The audio signal may include a voice signal and a synchronization signal. The synchronization signal (typically a tone) is used to indicate the start of the audio signal and thus provides an indication to the test system that the audio signal is about to follow. This provides a better match of the received audio signal to the reference signal clip and aids in performing the qualitative analysis of the received signal. The analysis of the audio signal may result in a voice quality scoring metric, such as a PAMS metric, a PSQM metric, a PESQ metric, and a MOS scoring metric. Post-processing of the received audio signal may also be performed.

In yet another embodiment, a computer readable medium having computer readable code thereon for providing call quality testing is described. The computer readable medium includes instructions for transmitting a query, the query resulting in an audio signal. The computer readable medium further includes instructions for receiving the audio signal and for analyzing the signal such as by comparing the signal with a reference signal clip. The computer readable medium also includes instructions for providing a voice quality scoring metric including one or more of the PAMS metric, a PSQM metric, a PESQ metric, and MOS scoring metric. The computer readable medium additionally includes instructions for generating a statistical parameter in response to the analyzing, the statistical parameter indicative of the quality of the signal. Additionally, the computer readable medium may include instructions for post-processing the received audio signal.

Still other embodiments include a computerized device, configured to process all the method operations disclosed herein as embodiments of the invention. In such embodiments, the computerized device includes a memory system, a processor, communications interface and an interconnection mechanism connecting these components. The memory system is encoded with a process that provides a call quality testing system as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer readable medium is one embodiment that has a computer-readable medium including computer program logic encoded thereon that when performed in a computerized device provides associated operations providing a call quality test system as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Empirix Inc. of Waltham, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Equipment manufactures and service providers of voice communications equipment and services need to ensure that the quality of their components and services are maintained at a high level. One way of ensuring high quality voice data and services is by performing call quality testing on their components and networks. This is preferably accomplished by way of a call quality test system.

In a particular embodiment the call quality test system dials directly into a customer premises system just as real callers do, using traditional TDM lines over integrated TDM and VOIP carrier networks and/or cellular networks to retrieve an audio signal. The retrieved audio signal is compared to a reference signal clip and call quality is assessed. Scores are documented and the appropriate person can be alerted if performance degrades beyond specified service levels. Thus, with such a call quality test system, potential problems can be addressed quickly before the customer is impacted.

As more companies implement VOIP and/or cellular networks in an effort to reduce costs and provide better, more widely distributed services to customers and employees close attention to any impact this may have on the customer's Quality of Service (QoS) is a major concern. In particular, for a contact center implementing VOIP and/or cellular networks, the contact center ultimately needs to ensure that they offer a QoS that equals or exceeds their existing TDM service. This concern is compounded for companies moving all or parts of their contact center operation offshore. Because traditional network management tools aren't able to capture the idiosyncrasies of voice, issues that can impact voice clarity need to be accounted for.

In a particular embodiment, the method and apparatus performs call quality testing across a communications network, which includes a PSTN as well as one or more of a VOIP network, and a cellular network. The method and apparatus further provides extensive Quality of Experience (QoE) metrics, voice quality scoring, including voice activity detection measurement, echo cancellation measurement and speech latencies.

Figure 1:
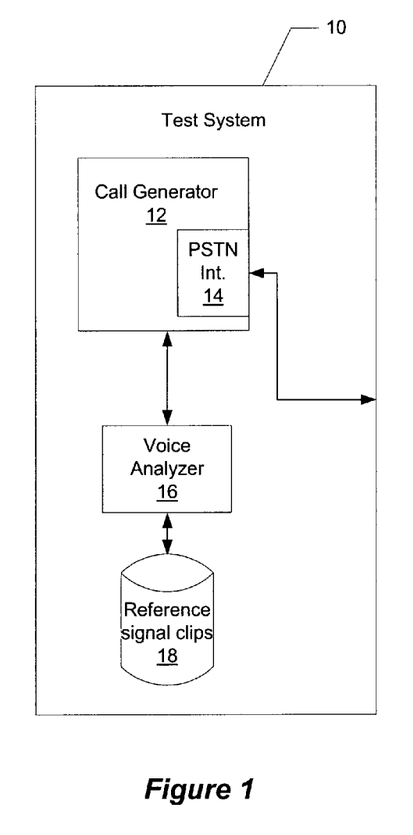
FIG. 1 is a block diagram of a call quality test system.

Referring now to FIG. 1, a block diagram of a particular embodiment of a test system 10 useful for providing call quality testing is shown. The test system 10 includes a call generator 12 having a PSTN interface 14, a voice analyzer 16, and a storage device 18 having one or more reference signal clips stored thereon. The call generator 12, for example, may be a HammerIT™ from Empirix, Inc. of Waltham, Mass., which can be used to simulate one or more telephone callers associated with a public switched telephone network (PSTN) who access the customer premises either sequentially or in parallel.

The test system 10 initiates a call over a communications network to a customer premises device, by way of call generator 12 and the PSTN interface 14. In response to the call an audio signal is received at the PSTN interface 14 of call generator 12. The received audio signal is provided to the voice analyzer 16. The voice analyzer 16 compares the received audio signal with a reference signal clip from the storage device 18 and generates a statistical parameter, which is indicative of the quality of the received signal.

During transmittal of the audio signal from the customer premises device to the test system 10, the signal may become subject to degradation due to a variety of factors. These factors include noise, static interference, packet reordering, packet jitter, dropped packets, multiple packets and the like. The voice analyzer 16 analyzes the received audio signal and provides a score or metric indicating the quality of the received signal. The metric may include one or more of a PAMS metric, a PSQM metric, a PESQ metric and a MOS metric. Post-processing may be performed on the received audio signal. Post-processing may include providing a sample of the audio signal such that a person may review the received audio signal. Post-processing may also include providing a visual representation of the audio signal and the reference voice clip which can be used for comparison, adjustment of file alignment, and amplitude observation. The post-processing may further include one or more of Voice Activity Detection (VAD) measurement, echo cancellation measurement and speech latency measurement.

VAD is used to detect periods of speech inactivity during a transmission. A lower transmission rate may be used during these periods of speech inactivity, preferably without affecting the quality of the voice transmission. The lower transmission rate used during the periods of speech inactivity provides for a more efficient utilization of the network. The use of VAD may affect the quality of the audio signal.

The existence of echo in a transmission line adversely impacts the quality of the voice signal. VOIP gateways typically implement echo cancellation once the gateway determines that echo exists above a predetermined threshold. Testing the impact of echo cancellation and the efficacy of echo cancellation can directly correlate to the signal quality. Two parameters are used to evaluate echo cancellation performance and the effect of echo cancellation on signal quality of a voice transmission. One parameter is known as Echo Return Loss (ERL) which measures how much residual echo is present in the voice signal. Another parameter is known as Echo Return Loss Enhancement (ERLE) which measures the amount of attenuation that is applied to a voice signal during the process of echo cancellation.

In one embodiment the audio signal may further include at least one synchronization tone. One synchronization tone is used to indicate a start of the audio signal and thus provides an indication to the test system that the audio signal is about to follow. Another synchronization tone may be used to indicate an end of the audio signal and thus provides an indication to the test system that the audio signal has completed. This provides a better match of the received audio signal to the reference signal clip and aids in performing the qualitative analysis of the received signal.

Figure 2:
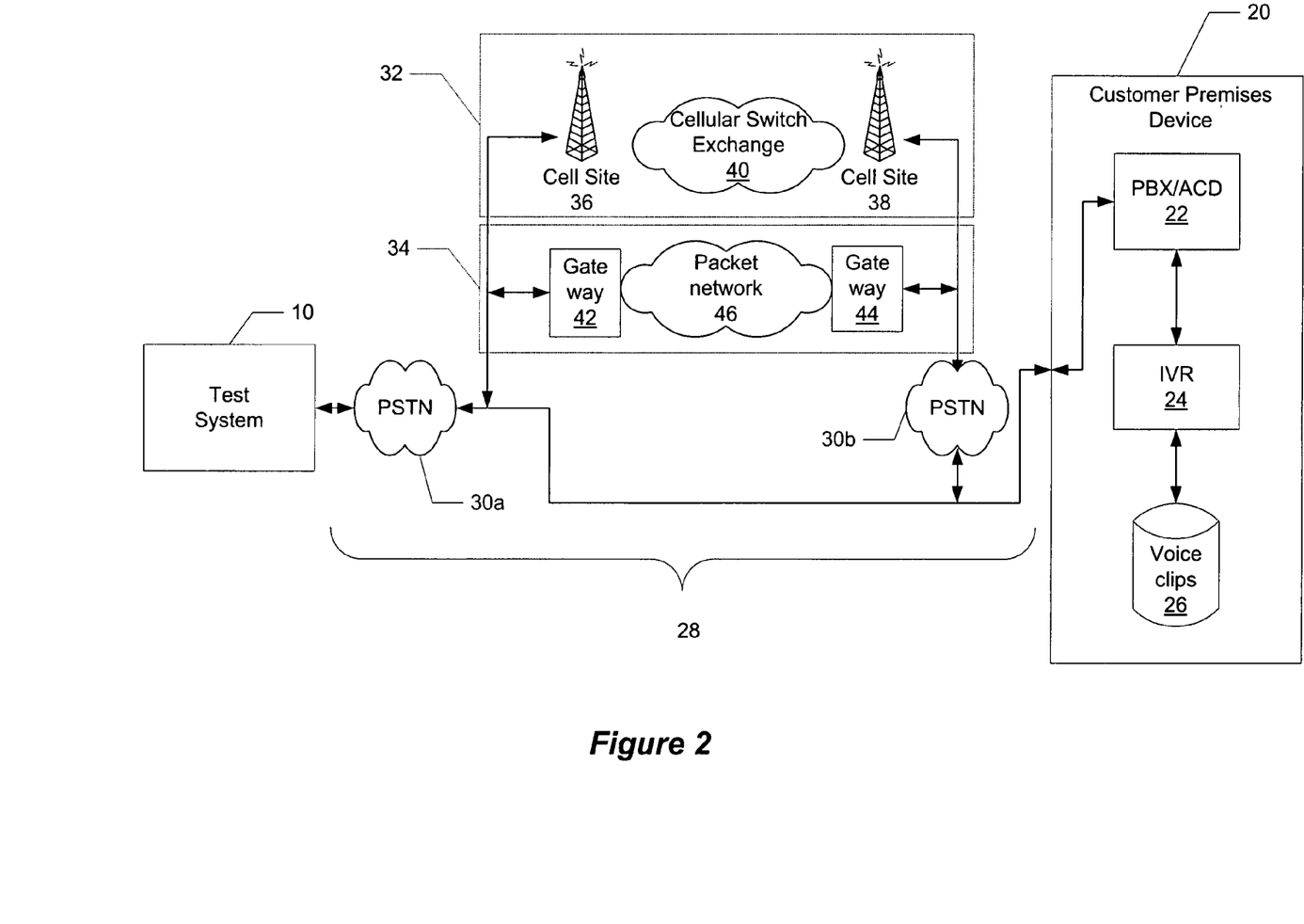
FIG. 2 is a block diagram of an environment for performing call quality testing.

Referring now to FIG. 2, an environment including the call quality test system 10 is shown. Test system 10 is used to place a query to a customer premises device 20 at a second location. The customer premises device 20 includes a Private Branch eXchange (PBX)/Automatic Call Distributor (ACD) 22, an IVR 24 and a storage device 26 having signal clips stored thereon. The PBX subsystem of PBX/ACD 18 is a system that directs incoming telephone calls to a destination within a customer premises. The ACD sub-system of PBX/ACD 18 provides call queuing and automatic wait handling of incoming telephone calls. An IVR 24 is a system that provides voice queries to a telephone caller. Voice queries typically direct the telephone caller through a series of selections that can be chosen by the telephone caller via button pushes on the telephone keypad.

The communications between the test system 10 at the first location and the customer premises device 20 at the second location is performed over a communications network 28. Communications network 28 includes a PSTN (including PSTN 30a and PSTN 30b) and one or more of a cellular network 32 and a VOIP network 34.

The test system 10 initiates a call over the communications network 28 to the customer premises device 20. The PBX/ACD 22 receives the call and directs the call to the IVR 24. The PBX/ACD 22 can be coupled to one or more IVR systems 24. The IVR 24 responds to the call with a response selected from the voice clips from storage device 26 to send back to the test system 10.

The audio signal is transmitted by the customer premises device 20 over the communications network 28, which may include a cellular network 32 and/or a VOIP network 34 and a PSTN 30a and 30b then to the test system 10.

The cellular network 32 comprises a first cell site 36, a second cell site 38 and a cellular switch exchange 40. Communications can occur bidirectionally through the cellular network 32. The call from the test system 10 enters the PSTN 30a, may then go to first cell site 36, through cellular switch exchange 40 to second cell site 38, to PSTN 30b, then to the customer premises device 20. For the audio signal that the call quality test is being performed on, the signal originates from customer premises device 20, is forwarded to PSTN 30b, to second cell site 38, is transmitted trough cellular switch exchange 40 to first cell site 36 to PSTN 30a and then to test system 10.

The VOID network 34 comprises a first gateway 42, a packet network 46 (e.g., the Internet or an intranet) and a second gateway 44. Communications can occur bidirectionally through the VOW network 34 as well. The call from the test system 10 enters the PSTN 30a, may then go to first gateway 42, through packet network 46 to second gateway 42, to PSTN 30b, then to the customer premises device 20. For the audio signal that the call quality test is being performed on, the signal originates from customer premises device 20, is forwarded to PSTN 30b, to second gateway 44, is transmitted through packet network 46 to first gateway 42 to PSTN 30a and then to test system 10.

The call from the test system 10 may traverse the PSTN and either or both of VOID network 34 and cellular network 32, and the return audio signal may traverse either or both of VOID network 34 and cellular network 32 to the PSTN 30. During the traversal of communications network 28 the quality of the signal may be affected by several factors, therefore performing a call quality test of the audio signal can be useful in determining potential trouble areas of the communications network and/or the customer premises equipment.

Figure 3:
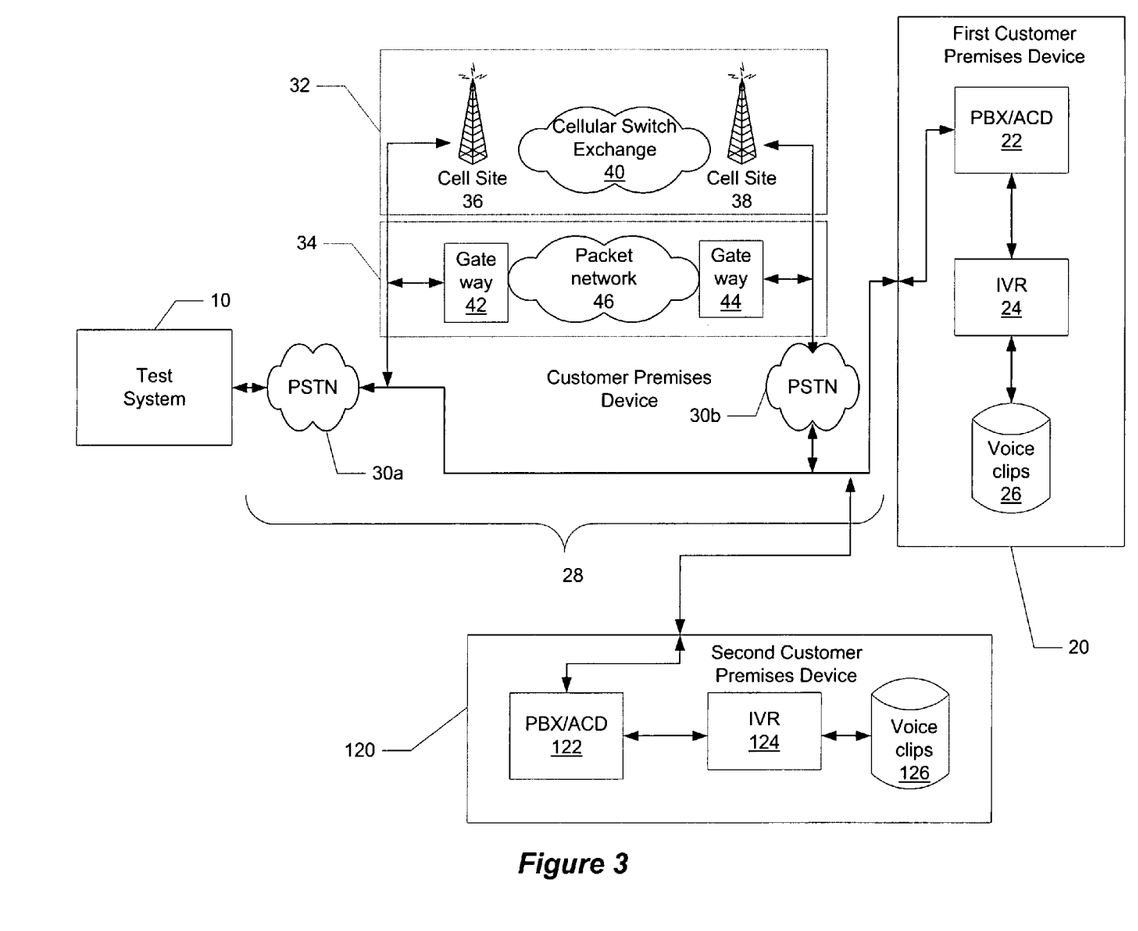
FIG. 3 is a block diagram of a multi-hop telephony network environment for performing call quality testing.

Referring now to FIG. 3, an multi-hop telephony environment including the call quality test system 10 is shown. Test system 10 is used to place a query to a first customer premises device 20 at a second location and/or to place a call to a second customer premises device 120 at a third location. The first customer premises device 20 has been described above. The second customer premises device 120 is similar to first customer premises device 20 described above, and also includes a second Private Branch eXchange (PBX)/Automatic Call Distributor (ACD) 122, a second IVR 124 and a second storage device 126 having signal clips stored thereon.

The communications between the test system 10 at the first location and the first customer premises device 20 at the second location as well as the second customer premises device at the third location is performed over a communications network 28. Communications network 28 includes a PSTN (including PSTN 30a and PSTN 30b) and one or more of a cellular network 32 and a VOID network 34.

In a particular embodiment, the test system 10 initiates a call over the communications network 28 to the first customer premises device 20. The PBX/ACD 22 receives the call and directs the call to the IVR 24. The PBX/ACD 22 can be coupled to one or more IVR systems 24. The IVR 24 responds to the call with a response selected from the voice clips from storage device 26 to send back to the test system 10. Alternately the call may be forwarded across communications network 28 to the second customer premises device 120. Within the second customer premises device 120 the PBX/ACD 122 receives the call and directs the call to the IVR 124. The PBX/ACD 122 can be coupled to one or more IVR systems 124. The IVR 124 responds to the call with a response selected from the voice clips from storage device 26 to send back to the test system 10.

The audio signal is transmitted by the customer premises device over the communications network 28, which may include a cellular network 32 and/or a VOIP network 34 and a PSTN 30a and 30b then to the test system 10.

The cellular network 32 comprises a first cell site 36, a second cell site 38 and a cellular switch exchange 40. Communications can occur bidirectionally through the cellular network 32. The call from the test system 10 enters the PSTN 30a, may then go to first cell site 36, through cellular switch exchange 40 to second cell site 38, to PSTN 30b, then to the customer premises device 20. For the audio signal that the call quality test is being performed on, the signal originates from customer premises device 20, is forwarded to PSTN 30b, to second cell site 38, is transmitted trough cellular switch exchange 40 to first cell site 36 to PSTN 30a and then to test system 10.

The VOID network 34 comprises a first gateway 42, a packet network 46 (e.g., the Internet or an intranet) and a second gateway 44. Communications can occur bidirectionally through the VOIP network 34 as well. The call from the test system 10 enters the PSTN 30a, may then go to first gateway 42, through packet network 46 to second gateway 42, to PSTN 30b, then to the customer premises device 20. For the audio signal that the call quality test is being performed on, the signal originates from customer premises device 20, is forwarded to PSTN 30b, to second gateway 44, is transmitted through packet network 46 to first gateway 42 to PSTN 30a and then to test system 10.

The call from the test system 10 may traverse the PSTN and either or both of VOIP network 34 and cellular network 32, and the return audio signal may traverse either or both of VOIP network 34 and cellular network 32 to the PSTN 30. During the traversal of communications network 28 the quality of the signal may be affected by several factors, therefore performing a call quality test of the audio signal can be useful in determining potential trouble areas of the communications network and/or the customer premises equipment.

In such a manner testing can be performed at multiple points in a multi-hop telephony network. Call quality data can be collected and analyzed as described above from multiple locations in the network in order to diagnose and pinpoint segments of the network which can affect call quality. Thus, data relating to the call quality of the first customer premises device 20 can be collected and analyzed. Additionally, data relating to the call quality of the second customer premises device 120 can also be collected and analyzed. This data from the first customer premises device and second customer premises device can then be used to determine which segments or area of the multi-hop telephony network may be affecting call quality.

Figure 4:
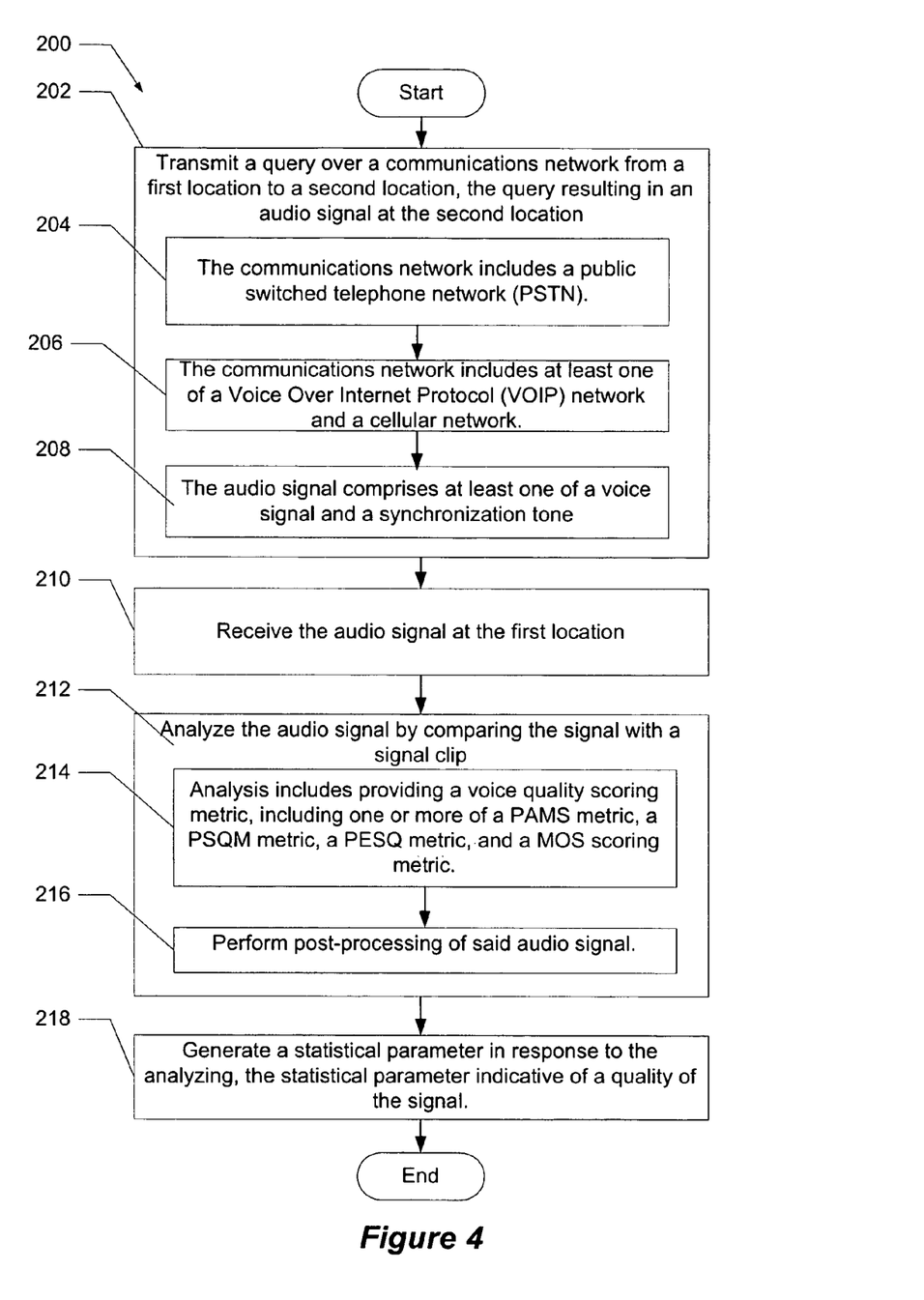
FIG. 4 is a flow chart of the method for performing call quality testing.

A flow chart of a particular method of performing call quality testing is depicted in FIG. 4. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4, a particular method 200 of performing call quality testing is shown. The method starts and processing block 202 is executed. In processing block 202 a query is transmitted over a communications network from a first location to a second location, the query resulting in an audio signal at the second location. In a particular embodiment the query is in the form of a phone call from a call quality test system.

Processing block 204 recites that the communications network includes a public switched telephone network. The PSTN is used to interface to and from the first location and to and from a second location.

Processing block 206 discloses that the communication network may further include at least one of a VOIP network and a cellular network. The various networks are used in conjunction with the PSTN for communication from the test system to the customer premises device as well as for communications from the customer premises device to the test system.

Processing block 208 states that the audio signal comprises at least one of a voice signal and at least one synchronization tone. One synchronization tone is used to indicate a start of the audio signal and thus provides an indication to the test system that the audio signal is about to follow. Another synchronization tone may be used to indicate an end of the audio signal and thus provides an indication to the test system that the audio signal has completed. This provides a better match of the received audio signal to the reference signal clip and aids in performing the qualitative analysis of the received signal.

Processing block 210 discloses that the audio signal is received at the test system. The audio signal is transmitted by the customer premises device, traverses the communications network, and arrives at the test system. The call generator receives the audio signal and forwards the signal to the voice analyzer where an analysis of the received signal can be performed.

Processing block 212 recites that the audio signal is analyzed. This analysis may include comparing the received audio signal to a reference signal clip to determine the degree to which the quality of the audio signal was affected by the customer premises device and/or the communications network.

Processing block 214 discloses that the analyzing may include providing a voice quality scoring metric, the metric including one or more of a PAMS metric, a PSQM metric, a PESQ metric, and a MOS scoring metric. These metrics are used to provide a quantitative measurement of the quality of the received audio signal.

Processing block 216 states that post-processing may be performed on the audio signal. This post-processing, for example, may include providing a sample of the audio signal such that a person can review the received audio signal, or providing a visual representation of the received audio signal and the reference signal clip which can be used for comparison, adjustment of file alignment, and amplitude observation. Post-processing may further include one or more of voice activity detection measurement, echo cancellation measurement, and speech latency measurement.

Processing block 218 recites that a statistical parameter is generated in response to the analyzing. The statistical parameter is indicative of a quality of the received signal. After completion of processing block 218, the process ends.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the test system (e.g., within random access memory or RAM). It is also to be understood that other embodiments of the invention can provide the applications operating within the test system. While not shown in this example, those skilled in the art will understand that the computer system may include other processes and/or software and hardware components, such as an operating system, which have been left out of this illustration for ease of description of the invention.

The above-described embodiments are useful for providing and performing multiple functions such as data capture and display, for performing testing, and for performing monitoring. The above-described embodiments are also useful as a product provided to customers and as a service provided to customers.

Having described preferred embodiments of the invention it will now become apparent to those of ordinary skill in the art that other embodiments incorporating these concepts may be used. Additionally, the software included as part of the invention may be embodied in a computer readable medium that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of determining call quality of a communication, comprising:
   transmitting a query over a communications network from a first location to a second location, the query resulting in an audio signal at the second location the audio signal including a first synchronization tone used to indicate a start of the audio signal and a second synchronization tone used to indicate an end of the audio signal;
   receiving the audio signal across the communications network at the first location;
   analyzing the audio signal by comparing the audio signal with a reference signal clip; and
   generating a statistical parameter in response to the analyzing, the statistical parameter indicative of a quality of the audio signal.

2. The method of claim 1, wherein said transmitting over a communications network includes transmitting over a public switched telephone network (PSTN).

3. The method of claim 2 wherein said communications network further comprises at least one of a Voice Over Internet Protocol (VOIP) network and a cellular network in communication with said PSTN.

4. The method of claim 1, wherein the analyzing includes providing a voice quality scoring metric, including one or more of a Perceptual Analysis Measurement System (PAMS) metric, a Perceptual Speech Quality Measurement (PSQM) metric, a Perceptual Evaluation of Speech Quality (PESQ) metric, and a Mean Opinion Score (MOS) scoring metric.

5. The method of claim 1 wherein said analyzing includes performing post-processing of said audio signal.

6. The method of claim 5 wherein said post-processing includes at least one of voice activity detection measurement, echo cancellation measurement, speech latency measurement, providing a sample of the audio signal and providing a visual representation of the audio signal and the reference signal clip.

7. A call quality testing system comprising:
   a call generator having an interface to a communication network, wherein said call generator provides a query to a remote device over said communication network and wherein said call generator receives an audio response to said query over said communication network, the audio response including a first synchronization tone used to indicate a start of the audio response and a second synchronization tone used to indicate an end of the audio response;

a voice analyzer in communication with said call generator; and a reference signal clip storage device in communication with said voice analyzer, wherein said voice analyzer compares said audio response to a reference signal clip and provides a statistical parameter indicative of a quality of the audio response.

8. The system of claim 7 wherein said interface to a communications network comprises an interface to a communications network including a PSTN.

9. The system of claim 8 wherein said interface to a communications network comprises an interface to a communications network further comprising at least one of a VOIP network and a cellular network in communications with said PSTN.

10. The device of claim 7 wherein said statistical parameter comprises at least one of a PAMS score, a PSQM score, a PESQ score and a MOS score.

11. The system of claim 7 wherein said voice analyzer performs post-processing of said audio response.

12. The system of claim 11 wherein said post processing includes at least one of voice activity detection measurement, echo cancellation measurement, speech latency measurement, providing a sample of the audio response, and providing a visual representation of the audio response and the reference signal clip.

13. A computer readable medium having computer readable code thereon for performing call quality testing, the medium comprising:

instructions for transmitting a query over a communications network from a first location to a second location, the query resulting in an audio signal at the second location, the audio signal including a first synchronization tone used to indicate a start of the audio signal and a second synchronization tone used to indicate an end of the audio signal;

instructions for receiving the audio signal at the first location;

instructions for analyzing the audio signal by comparing the audio signal with a reference signal clip; and instructions for generating a statistical parameter in response to the analyzing, the statistical parameter indicative of a quality of the signal.

14. The computer readable medium of claim 13, wherein said instructions for transmitting over a communications network includes instructions for transmitting over a public switched telephone network (PSTN).

15. The computer readable medium of claim 14, wherein said instructions for transmitting over a communications network further comprise instructions for transmitting over at least one of a Voice Over Internet Protocol (VOIP) network and a cellular network.

16. The computer readable medium of claim 13, wherein the instructions for analyzing includes providing a voice quality scoring metric, including one or more of a PAMS metric, a PSQM metric, a PESQ metric, and a MOS scoring metric.

17. The computer readable medium of claim 13 wherein said instructions for analyzing include instructions for performing post-processing of said audio signal.

18. The computer readable medium of claim 17 wherein said instructions for performing post-processing includes instructions for performing at least one of voice activity detection measurement, echo cancellation measurement, speech latency measurement, providing a sample of the audio signal and providing a visual representation of the audio signal and the reference signal clip.

19. The method of claim 6 wherein said providing a visual representation of the audio signal and the reference voice clip is used for comparison, adjustment of file alignment and amplitude observation.

20. The system of claim 12 wherein said providing a visual representation of the audio signal and the reference voice clip is used for comparison, adjustment of file alignment and amplitude observation.

21. The computer readable medium of claim 18 wherein said providing a visual representation of the audio signal and the reference voice clip is used for comparison, adjustment of file alignment and amplitude observation.

* * * * *